April 27, 1965 R. H. DAMON, JR., ETAL 3,180,573
RECORDER MECHANISM CONTROL MEANS
Filed July 13, 1962 3 Sheets-Sheet 1

INVENTOR.
ROGER H. DAMON JR.
J. CARTER MERRILL
BY BERNICE C. MERRILL
ADMINISTRATRIX OF THE ESTATE
OF J. CARTER MERRILL, DECEASED
BY: George A. Woodruff April 27, 1965  R. H. DAMON, JR., ET AL  3,180,573
RECORDER MECHANISM CONTROL MEANS
Filed July 13, 1962  3 Sheets-Sheet 2

INVENTOR.
ROGER H. DAMON JR.
J. CARTER MERRILL
BY BERNICE C. MERRILL
ADMINISTRATRIX OF THE ESTATE OF
J. CARTER MERRILL, DECEASED
BY: George A. Woodruff April 27, 1965   R. H. DAMON, JR., ETAL   3,180,573
RECORDER MECHANISM CONTROL MEANS
Filed July 13, 1962   3 Sheets-Sheet 3

*INVENTOR.*
ROGER H. DAMON JR.
J. CARTER MERRILL
*BY* BERNICE C. MERRILL
ADMINISTRATRIX OF THE ESTATE OF
J. CARTER MERRILL, DECEASED
BY:

United States Patent Office 3,180,573
Patented Apr. 27, 1965

3,180,573
RECORDER MECHANISM CONTROL MEANS
Roger H. Damon, Jr., St. Johnsbury, Vt., and Justin Carter Merrill, deceased, late of St. Johnsbury, Vt., by Bernice C. Merrill, administratrix, St. Johnsbury, Vt., assignors, by mesne assignments, to Fairbanks Morse Inc., New York, N.Y., a corporation of Delaware
Filed July 13, 1962, Ser. No. 211,470
4 Claims. (Cl. 235—61)

This invention relates to improvements in recorder mechanism for indicating values of a condition under measurement, as weight determined by weighing apparatus, and has particular reference to the provision in recorder mechanism having stepped disc engaging sensing elements, of improved control means for the sensing elements effective to assure accurate recording of values under measurement as weight or the like.

Recording mechanism of known or conventional forms widely used in connection with condition measuring apparatus such as weighing scales for example, generally include a plurality of stepped discs positioned by the measuring apparatus and representing the digit orders of units, tens, hundreds and so on of the measurement, and sensing elements movable to step sensing engagement with the discs. The sensing elements are employed through such movement, to condition the recorder for indicating the sensed value of the measurement by printed record or the like.

In mechanism of this character, when the discs are positioned such as to locate the units disc for units sensing element engagement on either the "0" step or the "9" step of a "0" to "9" stepped portion thereof, one or more of the higher order discs may then have a step thereof disposed such that its associated sensing element normally should contact the step close to or on the edge thereof at the drop-off to the next preceding or succeeding step. However, as not infrequently happens due to inaccuracies in manufacture or operational assembly of the discs and the sensing elements or for other reasons, a higher order sensing element may then engage its associated stepped disc on the step thereof next to that which should be engaged according to the measurement setting of the discs. Consequently, inaccurate recording results. For example, when the discs are positioned according to a weight value of say 4100 pounds, sensing movement of the sensing elements in bringing the units element to a "0" step on the units disc, should bring the tens element to a "0" step on the tens disc, the hundreds element to a "1" step on the hundreds disc, and the thousands element to step "4" on the thousands disc. Now, for the reasons indicated, the tens sensing element may then engage on the next preceding or "9" step of its disc, thus giving a reading of 4190 pounds or the hundreds sensing element may then engage on the next preceeding or "0" step of its disc, thus giving a reading of 4000 pounds, or both may be off, as to give the inaccurate reading of 4090 pounds. Other examples of inaccurate readings could be given here, but are omitted for the sake of brevity and since the occurrence of such inaccuracies are well known.

Accordingly, the principal object of the present invention is to provide an effective control of sensing element engagement with stepped digit discs such as will avoid the character of recorder inaccuracy hereinabove mentioned.

Another object is to provide sensing element control means for the purpose indicated, which is relatively simple yet highly effective to assure accurate recorder operation, and affords compensation for manufacturing and assembly inaccuracies in respect of the discs and sensing elements.

The foregoing and other objects and advantages of the present improvements will appear from the following description of a presently preferred embodiment of the invention as illustrated by the accompanying drawings, wherein.

Figure 1:
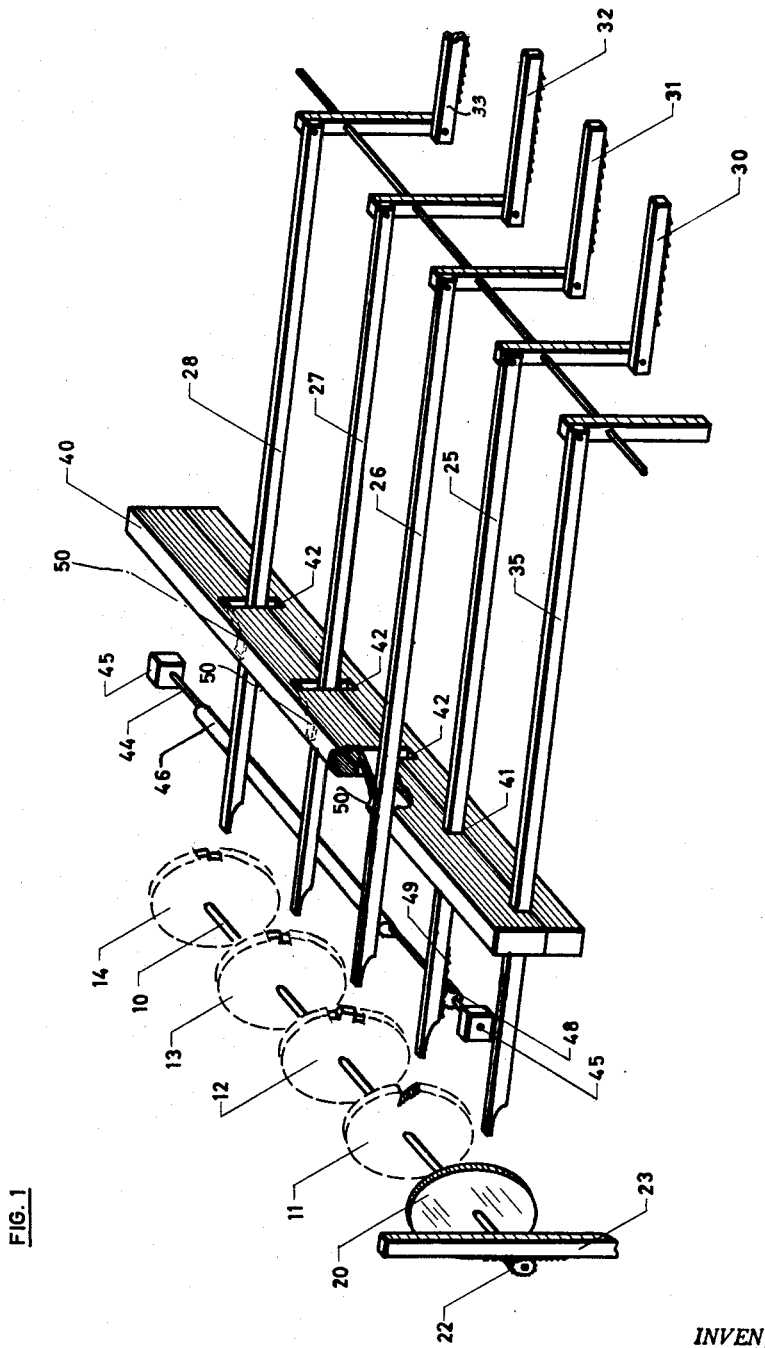
FIG. 1 is a diagrammatic view of a stepped disc and sensing element assembly showing the present improvements applied thereto.

Referring first to FIG. 1, fixed on a shaft 10 are a plurality of stepped digit discs 11, 12, 13 and 14 of well known character, the disc 11 presenting a plurality of stepped portions each of which has ten steps representing the units denomination digits "0" to "9," the "0" step in the present example being the radially outermost step. Similarly, disc 12 representing the tens denomination digits, has a series of stepped portions each with ten steps "0" to "9," while disc 13 representing the hundreds demonination digits has stepped portions each with ten steps "0" to "9." Disc 14 representing the thousands denomination, being the highest order disc shown in the present example, has steps "0" to the digit value according to the capacity of the recorder, and which for present purposes may be "4" thus affording a maximum measurement value reading of 4999. In addition, fixed on shaft 10 is a toothed disc 20 for a purpose to appear.

Shaft 10 having the stepped discs thereon, is rotated through a pinion 22 thereon engaged by a rack 23, the rack being displaced to an extent corresponding to the value of the condition under measurement. In the case of weighing apparatus with which the recorder embodying the present improvements may be associated, the rack, connected to the scale (not shown) in known manner, is so related thereto as to locate the stepped discs in zero datum positions under no-load on the scale, and to dispose the discs in rotation from the zero datum positions, to positions representative of the value (weight) of a load on the scale. While application to a weighing scale is herein referred to, it is obvious that the shaft and digit discs may be likewise actuated by means responsive to other conditions to be measured and recorded, as pressure, temperature, etc.

Sensing of the actuated positions of the stepped discs for recording purposes, is effected through sensing elements movable radially of the discs into step engagement therewith, the disc step engaged positions of such elements then being employed to determine or set-up the recorder apparatus for recording the thus sensed value of the condition under measurement, as weight in the present example. As illustrated in FIG. 1, related to the zero datum positions (no load on the scale) of the stepped discs are the sensing elements or fingers 25, 26, 27 and 28 individual respectively to the stepped discs 11 to 14. Mechanism for displacing the fingers to disc sensing engagement and return thereof to inactive positions may be of well known character, and so need not be here illustrated. However, as here shown the fingers 25 to 28 may serve to locate printing type indicia elements 30 to 33 respectively, for recording of the sensed value of the measurement (weight).

In addition and as is usual in sensing mechanism of the type shown, a holding finger 35 is provided for engaging the toothed disc 20 to hold the measurement actuated position of the shaft 10 and discs 11 to 14 while the sensing fingers 25 to 28 come into sensing engagement with the stepped discs. For this purpose, finger 35 actuated simultaneously with sensing actuation of fingers 25 to 28, engages toothed disc 20 prior to disc engagement by the sensing fingers.

Figure 2:
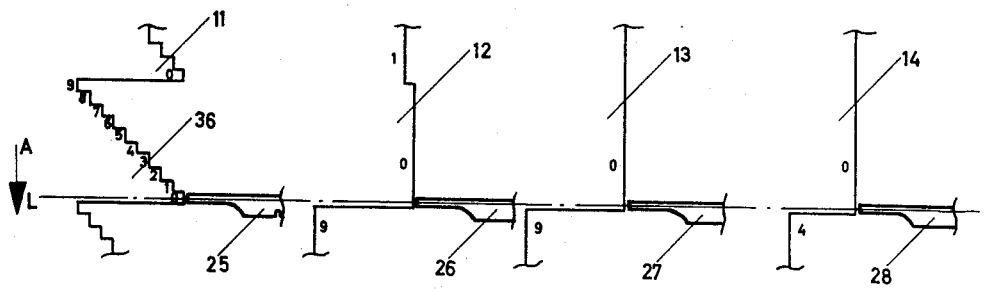
FIG. 2 illustrates diagrammatically the relationship of the stepped discs and sensing fingers at the zero datum position of these parts, as such normally would appear without finger position adjustment according to the present invention.

Turning now to the present provision for avoiding the errors or inaccuracies of measurement sensing as hereinbefore indicated, FIG. 2 shows in straight line projection step parts of the discs 11 to 14 aligned at the zero datum location thereof represented by the center line L—L. Movement of the discs from line L—L in weighing or other measurement actuation, is in the direction indicated by the arrow A. In this view, the units sensing finger 25 is on the radially outermost or "0" step of the first stepped portion 36 of units disc 11, while the tens and hundreds fingers 26 and 27 are shown engaged on the "0" steps of the initial stepped portions of the tens and hundreds digit discs 12 and 13, and the thousands finger 28 is on the "0" step of the thousands digit disc 14. In this view the fingers 26, 27 and 28 are shown engaged on the "0" steps of the associated discs at a point of each closely adjacent the step edge, as between the "0" step and "9" step of the last stepped portions of discs 12 and 13 and the "0" step and the last step "4" of disc 14. Also, this relationship is that which normally would obtain without sensing finger engagement errors and without the finger position control attained by the present improvements. It will be appreciated from the FIG. 2 illustration, that while the units finger 25 may be accurately located for engagement centrally on the units disc "0" step shown, unless extreme manufacturing tolerances are maintained and accurate assembly relationship effected in respect of the higher order fingers 26, 27 and 28, one or more of these fingers may not engage on the intended "0" steps but rather engage on the last "9" step in the case of discs 12 and 13 or on the "4" step in the case of the highest order disc 14. Thus in this instance, if inaccuracy obtains as to all the fingers 26, 27 and 28, the reading would be "4990" instead of the true reading "0000."

In order to obviate such error, the present improvements afford means under control of the units finger 25 for laterally shifting the higher order fingers to an extent providing for correct finger-disc step engagement and obviating any necessity for following close manufacturing tolerances or a high degree of accuracy in finger assembly relationship to the associated disc. Referring to FIG. 1, common to the fingers is a guide support 40 having a guide slot 41 through which the units sensing finger 25 extends in confinement thereby to radial displacement relative to the units stepped disc 11. Preferably the support 40 is similarly related to the position holding finger 35. In respect to the higher order sensing fingers 26 to 28, each thereof projects through a slot 42 which confines the finger to radial displacement while permitting limited displacement thereof laterally to one side or the other of its radial movement in the plane of its associated stepped disc. Extended transversely below the sensing fingers 25 to 28 rearwardly adjacent the disc engaging ends thereof, is a shaft 44 rotatably carried by suitable bearings 45. Fixed on the shaft is a cam element 46 slidably engaged by the higher order sensing fingers 26, 27, and 28, the cam being of generally circular section uniformly over its length and being mounted in eccentric position on the shaft. As shown in FIG. 1, shaft rotation for control positionment of the eccentric cam is effected by the units sensing finger 25 through a pinion 48 on shaft 44 and in driven mesh with the teeth of a rack section 49 provided on the underside of finger 25. Suitable means may be provided for retaining the higher order sensing fingers in cam-following engagement on the cam 46, such means in the present example being resilient elements or leaf springs 50 individual to the sensing fingers 26, 27 and 28. Each such spring is carried by the support 40 in extension in the slot 42 of the associated finger and engaging the finger on the upper side thereof to bias the finger against the cam 46.

In the initial or retracted positions of the sensing fingers as shown in FIG. 1, the units sensing finger 25 through its pinion-rack drive connection to shaft 44, angularly positions the eccentric cam 46 to present its high side or side most radially distant from the shaft 44, in upper position relative to the shaft. The cam thereby elevates or laterally displaces the higher order fingers 26, 27 and 28 upwardly to positions out of the plane containing the units sensing finger 25 and the stepped disc shaft 10. The pinion-rack drive of the eccentric cam is here predetermined with regard to the maximum travel distance of the units sensing finger 25 from retracted position to sensing engagement on the radially innermost or "9" digit step of a stepped section such as the section 36 on its disc 11, so that in moving to the "9" digit step the units sensing finger will cause rotational drive of the eccentric cam 46 from its position shown in FIG. 1 through approximately 180 degrees to its opposite terminal position. In the latter position, the high side of the cam is removed from contact by the higher order fingers 26, 27 and 28, such fingers then engaging on the low side of the cam. Also, the eccentric character and size of the cam 46, and its operative relation to the fingers 26–28, are determined to be such as to result in a lowering or downward lateral displacement of these fingers as the cam is turned to said opposite terminal position, the fingers passing through the plane of finger 25 and disc shaft 10 to positions therebelow, wherein the fingers engage the low side of the cam. In the position of the fingers on the low side of the cam, the fingers are displaced from the aforesaid plane by a distance approximately the same as that obtaining when the fingers are on the high side of the cam.

Figure 3:
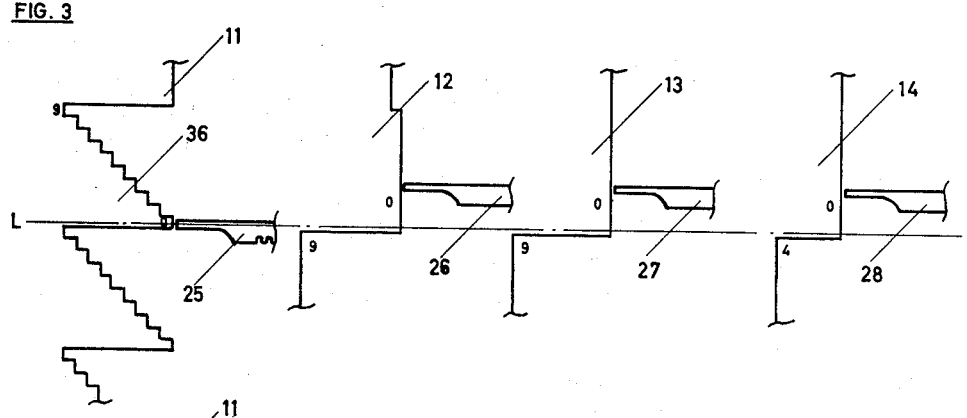
FIGS. 3, 4 and 5 illustrate diagrammatically, the relationship of the sensing elements and stepped digit discs attained in accordance with the present improvements.

Now, assume the stepped discs 11 to 14 to be in the zero datum locations thereof as shown in FIG. 3, and the sensing fingers 25 to 28 actuated from their retracted positions (FIG. 1) to sensing engagement with the discs. The resulting minimal distance travel of the units sensing finger 25 to the radially outermost "0" step of its disc 11 thus effects correspondingly minimal rotation of shaft 44 in the counterclockwise direction as viewed in FIG. 1. The cam 44 thereby effects a slight lowering of the higher order fingers 26–28, such that these fingers engage the "0" steps of their associated discs in positions as shown in FIG. 3. In such positions of "0" step engagement, each finger engages the "0" step at a point thereof appreciably removed from the critical point of engagement shown in FIG. 2, so that the possibility of errors as heerinbefore discussed in connection with the FIG. 2 positions of the fingers, is thereby clearly and effectively avoided.

Figure 4:
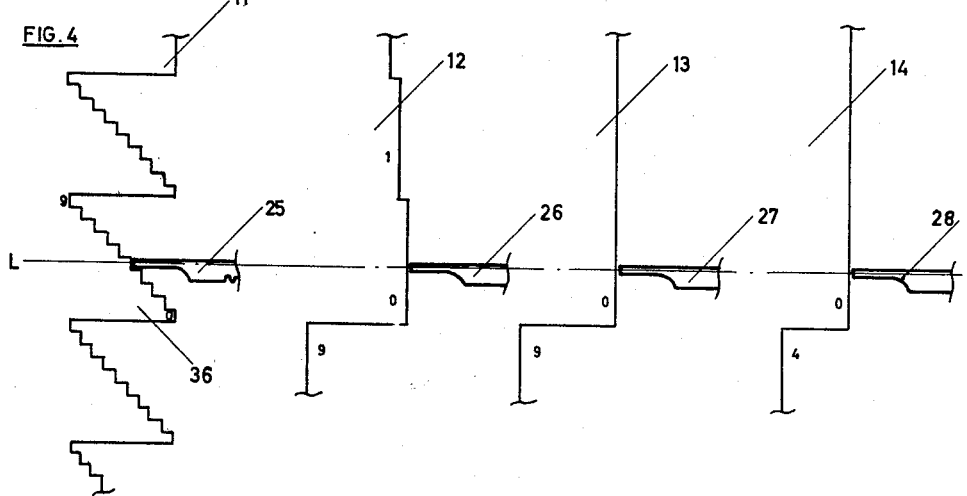
Figure 5:
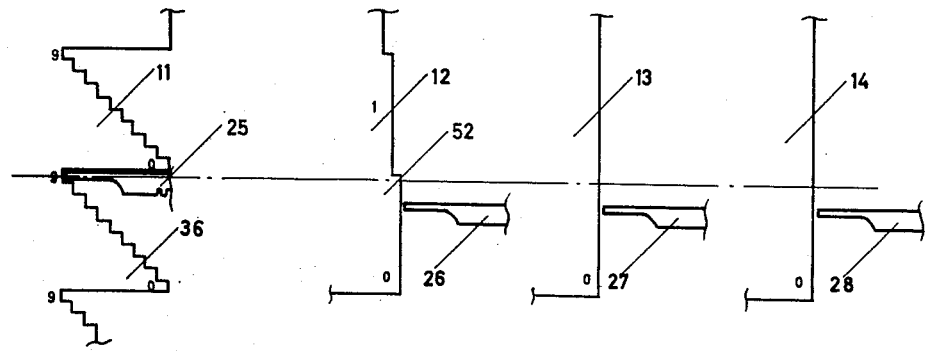

FIG. 4 illustrates the finger-disc relationship with the discs rotated from the zero datum locations (FIG. 3) sufficiently to permit the units sensing finger 25 to contact the "4" digit step of the units disc stepped section 36. In this condition, units finger actuation of the eccentric cam 46 positions the cam to determine the "0" step contacting positions of the higher order sensing fingers such as shown in FIG. 4 wherein the latter fingers are substantially in the plane of the units finger and disc shaft 10. Further rotation of the stepped discs sufficiently for units sensing finger contact on the innermost or "9" digit step of the units disc section 36, as this appears in FIG. 5, results in cam location of the higher order fingers (then in contact on the "0" steps of their associated discs) in position of lateral displacement substantially to the same extent as shown in FIG. 3 but on the opposite side of the aforesaid plane. In this case (FIG. 5), the tens finger 26 is removed from the critical disc contact point which it would normally occupy without cam shift thereof, such critical point being at 52 at the drop-off from the "0" step to the "1" step. It is to be noted here that in initial assembly of the parts, as well as in any subsequent re-assembly thereof after repairs or parts replacement, the cam 46 and its driven connection at the pinion 48 to units sensing finger rack 49, are disposed or adjusted to obtain the finger-disc relationship shown in FIG. 4. Such will assure the attainment of the opposite shifted positions of the higher order fingers shown by FIGS. 3 and 5.

It will be appreciated that since the cam 46 is of generally circular form in section, contact of the units finger on disc step "1" (relative to the position shown in FIG. 3) will position the cam to determine lateral shift of the higher order fingers at less than the full extent illustrated by FIG. 3. With the units finger on step "2," the resultant shift is still less, and so on to step "4" engagement by the units finger when the cam position will be such as to bring the higher order fingers to the positions shown in FIG. 4. Beyond step "4," units finger contact with steps "5," "6," "7" or "8" produces a corresponding degree of opposite shift of the higher order fingers toward the maximum shifted position shown in FIG. 5 obtaining when the units finger is on step "9" of its disc.

Figure 6:
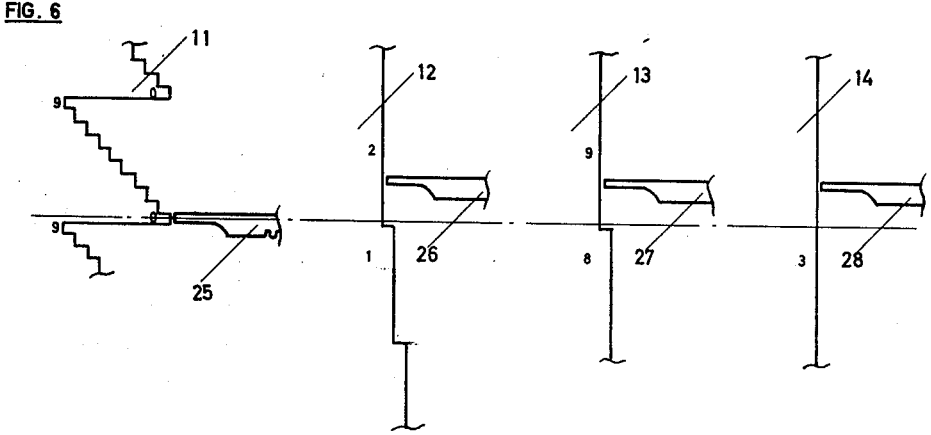
FIGS. 6 and 7 illustrate the relationship of the sensing elements and disc at various critical values.

Referring to FIG. 6, the stepped discs are shown in measurement actuated position to an extent corresponding to a scale weight, for example, of 3920 pounds. Upon sensing finger actuation to sensing engagement with the discs, the units sensing finger 25 contacts the "0" step of the appropriate stepped section on the units disc, while the tens finger 26 contacts on a step "2" of its disc, the hundreds finger 27 contacts on a step "9" of its disc, and the thousands finger 28 contacts step "3" on its disc. In this condition, the units finger controlled cam 46 effects lateral shift of the higher order fingers to the same extent as shown in FIG. 3, and thus in this example removes the tens and hundreds fingers from the critical contact points as at the step demarcation between steps "2" and "1" of the tens disc and the step demarcation between the steps "9" and "8" of the hundreds disc. Without the cam shift as here provided, the tens finger might engage on step "1" instead of step "2," thereby giving an erroneous indication of 3910 pounds, or the hundreds finger might contact on step "8" thus giving the erroneous reading of 3820 pounds. If both the tens and hundreds fingers are mis-stepped, then the erroneous reading would be 3810 pounds.

Figure 7:
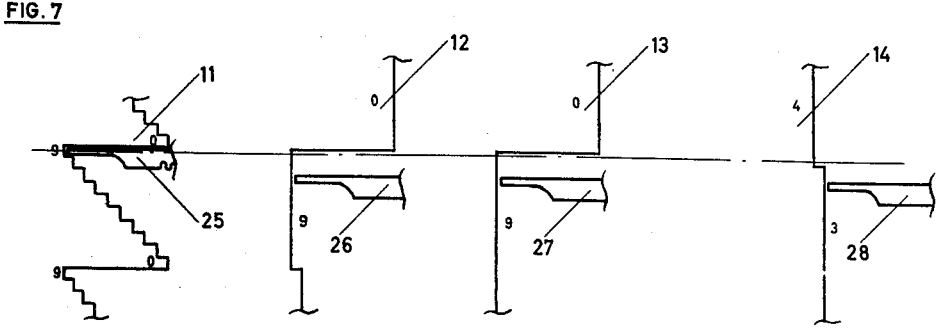

FIG. 7 illustrates the avoidance of error readings when the units finger is on a "9" step, with the stepped discs positioned correspondingly to scale measurement of 3999 pounds. It is evident here that with the cam shift of the higher order fingers, error readings of 3909, 3099, 4999, 4099 or 4009 pounds which might otherwise occur, are avoided. Many other examples of error avoidance could be given, but the foregoing are believed to be entirely sufficient for present understanding of the invention.

While for clarity in the diagrammatic view of FIG. 1 the sensing finger guide support 40 and the units finger controlled cam provision 46 are shown in spatial separation, it will be appreciated of course that the latter may be readily carried by or operatively incorporated in the support structure 40.

Having now illustrated and described a presently preferred embodiment of the invention, it is to be understood that various modifications may be made thereto without departing from the spirit and scope of the invention as hereinafter defined.

What is claimed is:

1. In means for exhibiting the numerical value of a condition under measurement, the combination of a plurality of stepped discs positionable in response to a measurement and representing the units, tens, hundreds and so on of the measurement, a first sensing element radially movable to step engagement with the units stepped disc, other sensing elements individual to the remaining stepped discs and radially movable to step engagement therewith, said other sensing elements being shiftable laterally relative to the radial direction of their movement, a single cam member common to and engaged by said other sensing elements operable for controlling lateral shift thereof, and means directly actuated by said first sensing element in radial movement thereof, for operating said cam member.

2. In means for exhibiting the numerical value of a condition under measurement, the combination of a plurality of stepped discs positionable in response to a measurement and representing the digit orders of units, tens, hundreds and so on of the measurement, the units disc having a series of stepped portions with ten steps in each portion, corresponding to the digits zero through nine, a first sensing element radially movable to step engagement with the units disc, other sensing elements individual to the remaining stepped discs and radially movable to step engagement therewith, said other sensing elements being shiftable laterally relative to the radial direction of their movement, and shift effecting means engaged by said other sensing elements and operable by said first sensing element, said shift effecting means being adapted and arranged for determining shift of said other sensing elements laterally in one direction relative to the radial direction of movement thereof, upon engagement of said first sensing element with one of the zero through three digit steps of any stepped portion of the units disc, and for determining lateral shift of said other sensing elements in the opposite direction relative to the radial direction of movement thereof, upon engagement of the first sensing element with one of the five through nine digit steps of any stepped portion of the units disc.

3. The subject matter of claim 2 characterized further in that the said shift effecting means comprises an eccentric camming member common to the said other sensing elements.

4. The subject matter of claim 2 characterized further in that the said shift effecting means comprises an eccentric camming member common to the said other sensing elements, and by guide means for the said first and other sensing elements and yieldable means on said guide means biasing the said other sensing fingers to engagement with said eccentric camming member.

References Cited by the Examiner
UNITED STATES PATENTS

| 2,719,669 | 10/55 | Schroeder | 235—1 |
| 2,730,303 | 1/56 | Hajos | 235—136 |
| 2,749,538 | 6/56 | Cooper et al. | 340—345 |
| 2,812,170 | 11/57 | Kennedy | 177—13 |
| 2,935,249 | 5/60 | Roth | 235—136 X |

LEO SMILOW, *Primary Examiner.*